United States Patent [19]  [11] 3,738,495
Esmond  [45] June 12, 1973

[54] EXCHANGE DEVICE
[76] Inventor: William G. Esmond, 537 Stamford Road, Baltimore, Md. 21229
[22] Filed: Apr. 13, 1971
[21] Appl. No.: 133,573

[52] U.S. Cl. .................................. 210/321, 210/493
[51] Int. Cl. .......................................... B01d 31/00
[58] Field of Search ...................... 210/22, 321, 493

[56] References Cited
UNITED STATES PATENTS
| | | | |
|---|---|---|---|
| 3,396,849 | 8/1968 | Lande et al. | 210/321 |
| 3,459,310 | 8/1969 | Edwards | 210/321 |
| 3,541,595 | 11/1970 | Edwards | 210/321 |
| 3,540,595 | 11/1970 | Edwards | 210/321 |

Primary Examiner—Frank A. Spear, Jr.
Attorney—Charles R. Allen

[57] ABSTRACT

This disclosure relates to an exchange device, particularly one which may be utilized as an artificial kidney, which includes first and second sets of flow plates separated by a pleated membrane. The flow plates with the pleated membrane entwined therebetween, are combined to define a stack with edges of the flow plates of one set being exposed along one side of the stack and edges of the other flow plates being exposed along the opposite side of the stack. Suitable manifold plates are clamped to opposite sides of the stack in opposition to the exposed edges and sealed relative thereto for effecting the flow of two fluids through the stack with the fluids being separated by the pleated membrane.

3 Claims, 10 Drawing Figures

INVENTOR
WILLIAM G. ESMOND

By
ATTORNEY

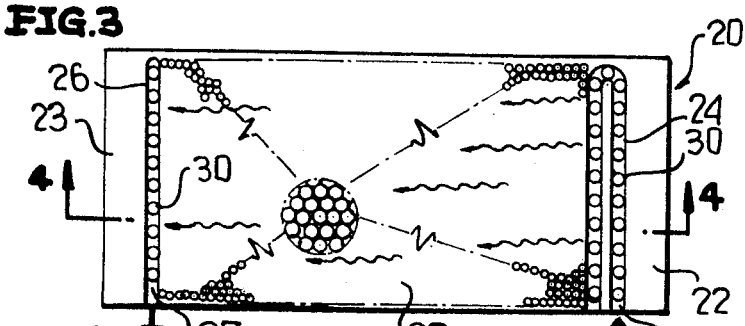
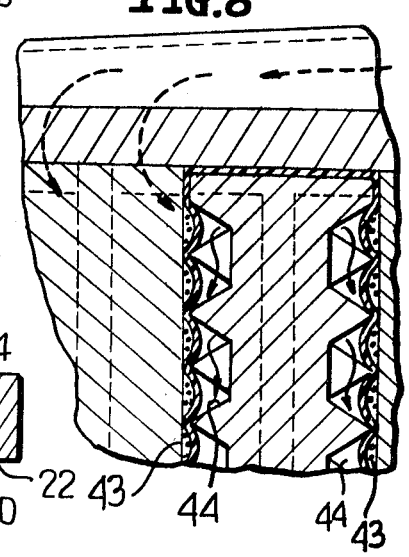
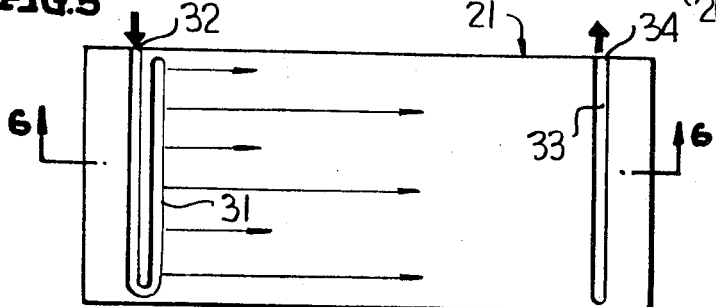
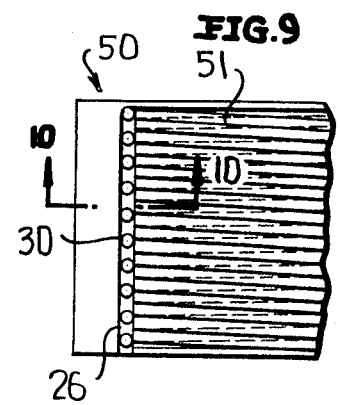
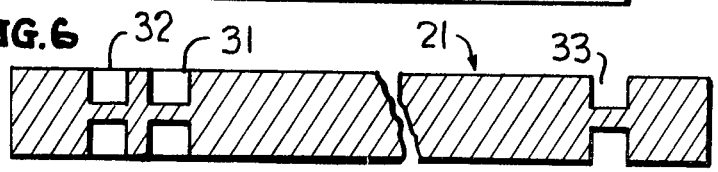
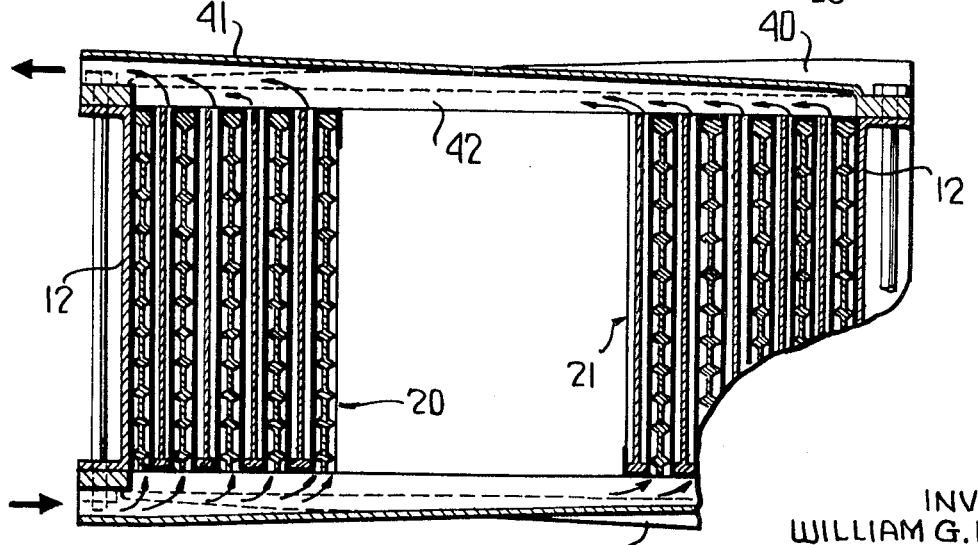
INVENTOR
WILLIAM G. ESMOND

3,738,495

EXCHANGE DEVICE

This invention relates in general to new and useful improvements in exchange devices, and more particularly to an exchange device which may be utilized as an artificial kidney.

BACKGROUND OF THE INVENTION

It is well known to provide exchange devices which may be utilized as artificial kidneys. It is also well known to provide exchange devices which include flow plates and a pleated membrane separating the two. However, in the past, such flow plates were of a relatively complex construction and difficulties were encountered in providing proper seals between adjacent flow plates utilizing only the pleated membrane as the sealing agent.

SUMMARY OF THE INVENTION

In accordance with this invention, it is proposed to provide exchange device which includes first and second sets of flow plates disposed in alternating relation and separated by a membrane which is in the form of a pleated membrane which extends around two faces of one edge of each flow plate.

The membrane may be readily sealed with respect to the flow plates by bonding the membrane to the edges of the flow plates remote from the exposed edges thereof. Further, an effective seal is obtained between each flow plate and the pleated membrane in that no openings are required in the membrane, nor are there any true openings in any of the flow plates.

In accordance with this invention, flow plates for the exchange device are provided wherein all flow into and out of the stack of flow plates is through edges of the flow plates. Thus, it is relatively easy to provide an effective seal between the flow plates and the membrane, as well as the flow plates of one another.

In order that the desired flow may be obtained across the sources of the flow plates even though the fluid entrance and exit points are along the same edge of the flow plates, each flow plate includes a flow channel which is U-shaped in plan both by incoming and outgoing flow of fluid along a surface of a flow plate is parallel thereby providinG a maximum uniformity of fluid flow.

With the above and other objects in view that will hereinafter appear, the nature of the invention will be more clearly understood by reference to the following detailed description, the appended claims and the several views illustrated in the accompanying drawings:

In the drawings:

FIG. 3 is a plan view of one of the flow plates.

FIG. 4 is a longitudinal sectional view taken along the line 4—4 of FIG. 3 and shows further the details of the flow plate.

FIG. 5 is a plan view of a second of the flow plates.

FIG. 6 is an enlarged longitudinal sectional view showing further the details of the flow plate.

FIG. 7 is an enlarged fragmentary vertical sectional view taken along the line 7—7 of FIG. 1 and shows the flow of one fluid through the exchange device.

FIG. 8 is an enlarged fragmentary sectional view showing the deformed in which the membrane is defromed so as to provide two separate flow paths for two separate fluids.

FIG. 9 is a fragmentary plan view of a modified form of contoured flow plate.

Figure 1:
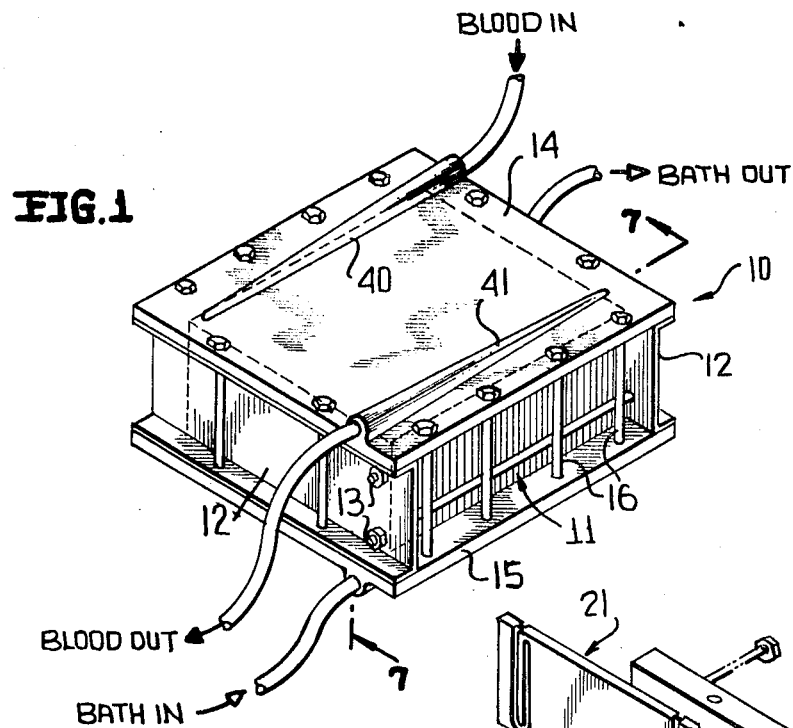
FIG. 1 is a perspective view of the exchange device and shows generally the details thereof.

Referring now to the drawings in detail, it will be seen that the exchange device is generally identified by the numeral 10 and includes a stack 11 which is maintained by a pair of clamp plates 12 secured together by suitable tension devices 13 which may be in the form of simple bolts. To the opposite sides of the stack 11 there are clamped manifold plates 14 and 15 by means of simple tensioning devices 16 which may be simply in the form of bolts.

Figure 2:
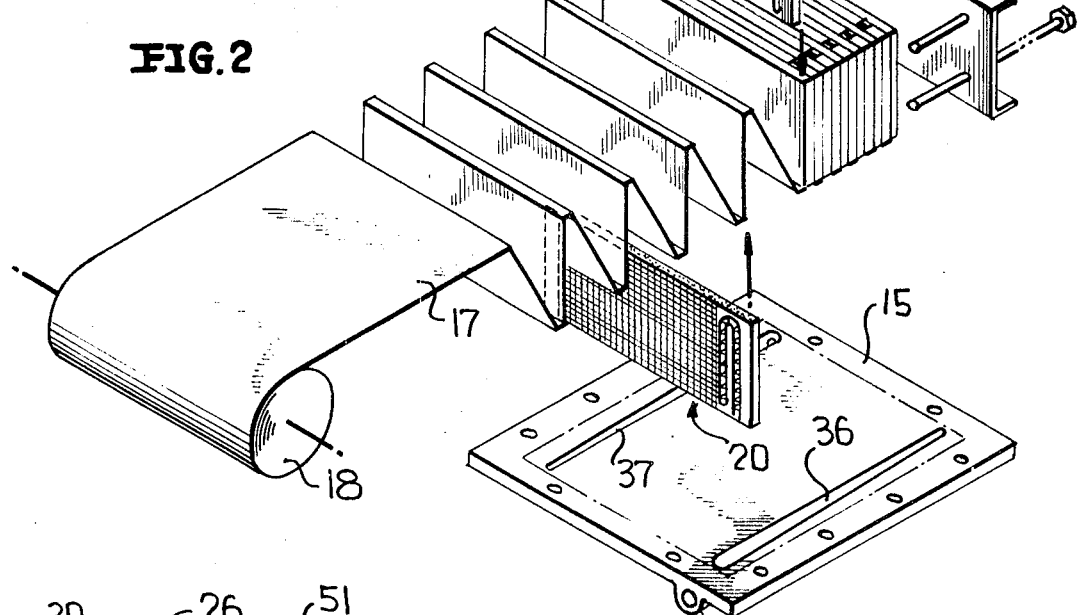
FIG. 2 is a schematic fragmentary exploded perspective view showing the details of the exchange device and the manner in which the components thereof are assembled.

Referring now to FIG. 2, it will be seen that the stack 11 includes a pleated membrane 17 which may be in the form of a continuous web supplied in the form of a roll 18 and pleated in any desired manner. There are assembled with the pleated membrane 17 in alternating relation flow plates 20 and 21 which are rectangular in outline and which are in the form of flat plates.

Referring now to FIGS. 3 and 4 in particular, it will be seen that the flow plate 20 is provided with planar end portions 22 and 23. In the end portion 22, at opposite surfaces of the flow plate 20, there is provided a generally U-shaped channel 24. That leg of the channel 24 disposed adjacent the end of the flow plate 30 is provided with an entrance opening 25 through the edge of the flow plate 20. The opposite leg of the U-shaped channel 24 is closed adjacent that same edge of the flow plate in which the entrance opening 25 is formed.

The opposite surfaces of the flow plate 24 are also formed in the end portions 23 with a channel 26 which opens through the same edge of the flow plate 20 in which the inlet opening 25 is formed in an outlet or return opening 27.

Between the channels 24 and 26, each surface of the flow plate 20 is contoured as at 28 to define a plurality of flow paths between the channels 24 and 25 whereby there may be uniform flow of fluid across the faces of the flow plate 20. In the preferred embodiment of the invention, the contoured portions 28 of the flow plates 20 are in the form of a plurality of rows of small projections, preferably conical but also pyramidal projections.

In order to prevent the collapse of the membrane 17 into the channels 24 and 26, it is to be noted that these channels are provided with small projections fully spaced longitudinally thereof and forming membrane supports. These projections provide for controlled inhibited flow of fluid through the channels 24,26.

Referring now to FIGS. 5 and 6, it will be seen that the flow plate 21 is a substantially planar flow plate. However, formed adjacent one end thereof, and in the opposite faces thereof is a U-shaped supply channel 31. The supply channel 31 opens through one edge of the flow plate 21 in an inlet opening 32. The opposite surfaces of the flow plate 21 are also provided adjacent the opposite end thereof with a return channel 33 which opens through the same edge of the flow plate as does the channel 31 in a return opening 34. It is to be noted that the flow plate 21 between the channels 31 and 33 is planar.

Returning now to FIG. 2, It will be seen that there is illustrated the details of the manifold plate 15. The manifold plate 15 is provided with a supply manifold 35 which gradually decreases in cross section and which opens to the inner surface of the manifold plate 15 in a manifold port or supply port 36. When the manifold plate 15 is assembled with the stack 11, the manifold port 36 is aligned with the inlet openings 25 in the flow plates 20 for supplying a fluid into the channels 24.

The manifold plate 15 also includes a return manifold duct 37 which opens into a return manifold 38 which is shown in FIG. 7. The duct 37 is aligned with the outlet openinGs 27 of the channels 26.

From the foregoing, it is to be understood that the manifold plate 14 is of substantially the same construction as the manifold plate 15 and includes a supply manifold 40 and a return manifold 41. The supply manifold 40 opens through the inner surface of the manifold plate 14 in a supply port (not shown) which is aligned with the inlet openings 32 of the flow plates 21. The return manifold 41 has opening thereinto a return port 42 (FIG. 7) which is aligned with the outlet openings 34 of the flow plates 21.

With reference to FIG. 8, it will be seen that when the flow of the fluid circulating through the stack 11 through the manifold plate 14 is at a higher pressure than that fluid circulated through the stack 11 through the manifold plate 15, the membrane 17 will be deformed partially into the contoured portions 28 of the flow plates 20, as is shown in FIG. 8, so as to define flow paths between the membrane 17 and the planar surfaces of the flow plates 21 between the channels 31,33. Thus, there are disposed on opposite surfaces of each panel of the membrane 17 flow paths 43,44. It is also to be noted from a comparison of FIGS. 3 and 5 that the flow of fluids on opposite sides of each panel of the membrane 17 is in opposite directions.

When the exchange device 10 is in the form of an artificial kidney, for example, it is preferable that the membrane be formed of cellulose cuprothan membrane material or the like material. Also, the edges of the flow plates 20,21 in which inlet and outlet openings are not formed should be adhesively secured to the membrane 17 by a thin layer of a suitable sealing compound such a R.T.V. silicone cement or a polyurethane cement. Also, it is to be understood that blood should be circulated through the stack 11 through the manifold plate 14 while a suitable dialysate should be circulated through the stack through the manifold plate 15. It is to be understood that the pressure of the blood will be greater than the pressure of the dialysate so as to provide for the necessary deformation of the membrane 17 to form the two flow paths 42,43 illustrated in FIG. 8.

It is to be understood that with the flow plate and membrane assembly of the exchange device 10, coupled with the specific manifold plate constructions, provide for uniform flow of both blood and dialysate, providing for a maximum exchange as well as a uniform exchange.

Figure 10:
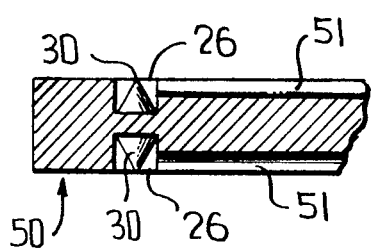
FIG. 10 is an enlarged fragmentary sectional view taken along the line 10—10 of FIG. 9 and shows further the details of the flow plate.

Reference is now made to FIGS. 9 and 10 wherein there is illustrated a modified form of contoured flow plate which may be utilized in lieu of the flow plate 20. The flow plate of FIGS. 9 and 10 is generally identified by the numeral 50 and will be identical with the flow plate 20 except that in lieu of the contoured portion being in the form of a plurality of rows of projections, it will be in the form of a plurality of grooves 51 which extend between the channels 24,26. The grooves 51 extend longitudinally of the flow plates 50 on opposite surfaces thereof. It is preferable, although not necessary, that the grooves 51 extend at a slight angle to the edge of the flow plate 50 and that the grooves on opposite surfaces of the flow plates be disposed in cross relation. This is schematically illustrated in FIG. 9.

Although only a preferred embodiment of the exchange device has been specifically illustrated and described herein, it is to be understood that minor modifications may be made therein without departing from the spirit and scope of the invention, as defined in the appended claims.

I claim:

1. An exchange device comprising first and second sets of flow plates arranged in alternating relation, means spacing and sealing adjacent plates from one another, all of the plates of said first set having a like exposed edge facing in one direction, each said exposed edge having an inlet opening and an outlet opening, all of the plates of said second set having a like exposed edge facing in a direction opposite from said one direction, each said set second plate edge having an inlet opening and an outlet opening, a first fluid distribution plate engaging edges of said plates in opposition to said first set plate edges, and a second fluid distribution plate engaging edges of said plates in opposition to said second set plate edges, each flow plate including an inlet channel in at least one face thereof extending from said inlet opening and a return channel opening into said outlet opening, said inlet and outlet channels being spaced from one another whereby flow between said inlet channel to said outlet channel is across a major portion of said flow plate face, one of said channels being of a U-shaped outline with flow in adjacent portions of said inlet and outlet channels being in the same direction.

2. An exchange device comprising first and second sets of rectangular flow plates arranged in alternating relation, means spacing and sealing adjacent plates from one another, all of the plates of said first set having a like exposed edge facing in one direction, each said exposed edge having an inlet opening and an outlet opening, all of the plates of said second set having a like exposed edge facing in a direction opposite from said one direction, each said set second plate edge having an inlet opening and an outlet opening, a first fluid distribution plate engaging edges of said plates in opposition to said first set plate edges, and a second fluid distribution plate engaging edges of said plates in opposition to said second set plate edges, each flow plate including an inlet channel in at least one face thereof extending from said inlet opening and a return channel opening into said outlet opening, said inlet and outlet channels being spaced from one another along a major dimension of each flow plate whereby flow between said inlet channel and a cooperating outlet channel is across a major portion of said flow plate face, the surface of flow plates of one of said sets between said channels being planar and the surface of said flow plates of the other of said sets being contoured to form in combination with said spacing and sealing means to form first flow paths between said channels of each respective flow plate, and said spacing and sealing means being in the form of a readily deformable sheet material partially deformable under differential fluid pressure to partially deform to correspond to said flow plates contoured surfaces and to form in combination with said flow plate planar surfaces second flow paths, said first and second flow paths being separated by said sheet material, opposite surfaces of each flow plate being like contoured with there being similar flow on opposite sides of each flow plate.

3. The exchange device of claim 2 wherein said flow plate contoured surface is in the form of a plurality of adjacent upstanding projections of the generally conical and pyramidal type.

* * * * *